United States Patent [19]

Whitley, II et al.

[11] Patent Number: 5,507,324

[45] Date of Patent: Apr. 16, 1996

[54] FUEL FILL DEVICES FOR BOATS

[75] Inventors: Warwick M. Whitley, II, Lynn Haven, Fla.; Donald L. Clark, Grand Rapids, Mich.

[73] Assignee: Attwood Corporation, Lowell, Mich.

[21] Appl. No.: 315,149

[22] Filed: Sep. 29, 1994

Related U.S. Application Data

[63] Continuation-in-part of Ser. No. 215,264, Mar. 21, 1994.

[51] Int. Cl.$^6$ ....................................................... B65B 31/00
[52] U.S. Cl. ........................... 141/59; 141/44; 141/286; 220/86.2; 220/303; 220/374; 220/DIG. 33
[58] Field of Search .................................. 141/44, 45, 59, 141/286, 312; 220/86.1, 86.2, 205, 209, 303, 326, 374, DIG. 33; 16/257

[56] References Cited

U.S. PATENT DOCUMENTS

| | | |
|---|---|---|
| Re. 16,994 | 6/1928 | Cohn . |
| D. 300,129 | 3/1989 | Whitley, II .............................. D12/197 |
| D. 312,442 | 11/1990 | Whitley, II .............................. D12/197 |
| 1,189,764 | 7/1916 | Whitman . |
| 1,371,669 | 3/1921 | Davis . |
| 1,574,500 | 2/1926 | Marte . |
| 1,585,512 | 5/1926 | Roades . |
| 1,952,484 | 3/1934 | Allee . |
| 2,151,043 | 3/1939 | Paton ..................................... 158/36.5 |
| 2,159,178 | 5/1939 | Rike et al. . |
| 2,177,224 | 10/1939 | Ohlrogge .................................. 215/56 |
| 2,356,327 | 8/1944 | Lebus . |
| 2,388,395 | 11/1945 | Duggan ..................................... 220/88 |
| 2,494,679 | 1/1950 | Ward, Jr. . |
| 2,786,091 | 3/1957 | Spellier . |

(List continued on next page.)

FOREIGN PATENT DOCUMENTS

| | | |
|---|---|---|
| 551131 | 1/1958 | Canada . |
| 2372100 | 6/1978 | France . |
| 738537 | 12/1943 | Germany . |
| 2336239 | 2/1975 | Germany . |
| 2553881 | 6/1977 | Germany . |
| 542124 | 12/1956 | Italy . |
| 612950 | 11/1948 | United Kingdom . |
| 836075 | 11/1957 | United Kingdom . |
| 915862 | 3/1958 | United Kingdom . |
| 1175875 | 1/1970 | United Kingdom . |
| 1595030 | 8/1981 | United Kingdom . |

OTHER PUBLICATIONS

Attwood 1992-93 Product Catalog, pp. 75, 78-83 & cover.
Advertisement entitled "NEW from . . . PERKO, INC., Combination Gas Fill & Tank Vent—Fig. 1319" by Perko, Inc. of Miami, FL, Feb. 1993.
Photograph Exhibits A-F of hand-made prototype of Attwood vented fuel fill.

*Primary Examiner*—J. Casimer Jacyna
*Attorney, Agent, or Firm*—Price, Heneveld, Cooper, DeWitt, & Litton

[57] ABSTRACT

A fuel filling assembly for liquid fuel tanks, especially on boats or the like, includes a fill tube adapted for mounting through a deck and a closure cap preferably hinged over the fill tube opening for selective opening and closing. Preferably, a positioning member allows the closure cap to be mounted in various positions with respect to the fill tube to accommodate various mounting locations on a boat. The fill tube may be angled or straight to further accommodate varied mounting positions. In one version, a separate vent tube joins the fill tube to provide continuous fuel tank venting, pressure equalization and return of fuel overflow to the fuel tank in case of tank overfill. In the vented version, a rigid shield on the closure cap extends over the opening to a vent passageway through the cap to restrict the escape of liquid fuel in the event of fuel surge due to extreme boat movements or the like when the closure cap is closed. The vent passageway is preferably tortuous to restrict ingestion of water or other contaminants and a baffle is mounted over the vent tube opening to prevent expulsion of fuel through the fill tube opening during tank filling when the closure cap is in open position. The positioning member and angled or straight fill tube may also be included in the vented version.

18 Claims, 7 Drawing Sheets

U.S. PATENT DOCUMENTS

| | | | |
|---|---|---|---|
| 3,067,908 | 12/1962 | Graham . | |
| 3,083,862 | 4/1963 | Bowden . | |
| 3,330,439 | 7/1967 | Moorman | 220/86 |
| 3,334,667 | 8/1967 | Hedstrom | 141/46 |
| 3,335,741 | 8/1967 | Liljendahl | 137/247.15 |
| 3,385,468 | 5/1968 | Fleming et al. . | |
| 3,477,611 | 11/1969 | Niles | 220/86 |
| 3,633,609 | 1/1972 | Benner | 137/351 |
| 3,872,900 | 3/1975 | Gotz | 141/392 |
| 3,907,153 | 9/1975 | Mutty | 220/86 |
| 3,979,010 | 9/1976 | Fiedler et al. | 220/86 |
| 3,981,156 | 9/1976 | Modisette et al. | 62/54 |
| 4,058,147 | 11/1977 | Stary et al. | 141/45 |
| 4,094,437 | 6/1978 | Hayashida | 220/374 |
| 4,113,138 | 9/1978 | Fields et al. | 220/367 |
| 4,142,648 | 3/1979 | Johnson et al. | 220/203 |
| 4,168,011 | 9/1979 | Lomer | 220/94 |
| 4,168,012 | 9/1979 | Hawkinson | 220/209 |
| 4,265,752 | 5/1981 | O'Banion | 210/172 |
| 4,341,322 | 7/1982 | Heinke | 220/210 |
| 4,394,925 | 7/1983 | Rump et al. | 220/86 |
| 4,450,880 | 5/1984 | Scheurenbrand | 141/285 |
| 4,690,293 | 9/1987 | Uranishi et al. | 220/86 |
| 4,714,172 | 12/1987 | Morris | 220/86 |
| 4,722,454 | 2/1988 | Fischer . | |
| 4,730,652 | 3/1988 | Bartholomew | 141/302 |
| 4,739,808 | 4/1988 | Schmidt | 141/286 |
| 4,769,050 | 9/1988 | Shaw et al. | 55/171 |
| 4,795,053 | 1/1989 | Kasugal et al. | 220/303 X |
| 4,809,863 | 3/1989 | Woodcock et al. . | |
| 4,816,045 | 3/1989 | Szlaga et al. | 55/168 |
| 4,854,469 | 8/1989 | Hargest | 220/86 |
| 4,869,283 | 9/1989 | Oeffling et al. | 137/43 |
| 4,877,146 | 10/1989 | Harris . | |
| 4,884,716 | 12/1989 | Steiner | 220/303 X |
| 4,932,444 | 6/1990 | Micek | 141/59 |
| 4,941,587 | 7/1990 | Terada . | |
| 4,963,169 | 10/1990 | Granville | 55/185 |
| 4,971,219 | 11/1990 | Dombeck et al. | 220/303 |
| 5,000,339 | 3/1991 | Wheat et al. | 220/203 |
| 5,022,433 | 6/1991 | Jansky et al. | 137/588 |
| 5,103,877 | 4/1992 | Sherwood et al. | 141/59 |
| 5,131,439 | 7/1992 | Bucci | 141/59 |
| 5,152,419 | 10/1992 | Yanagi | 220/374 |
| 5,160,054 | 11/1992 | Nolte | 220/374 |
| 5,186,221 | 2/1993 | Ellis | 141/59 |
| 5,195,566 | 3/1993 | Ott et al. | 141/312 |
| 5,234,122 | 8/1993 | Cherng | 220/211 |
| 5,269,431 | 12/1993 | Sakata et al. | 220/205 |
| 5,275,213 | 1/1994 | Perkins | 141/59 |
| 5,327,946 | 7/1994 | Perkins | 141/59 |

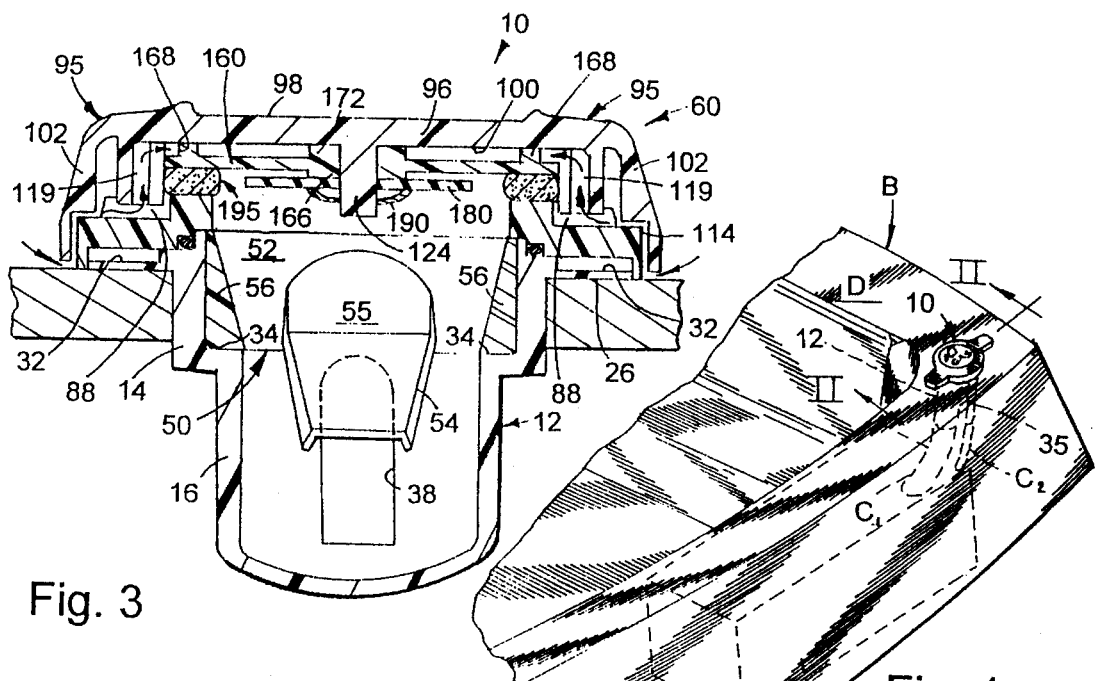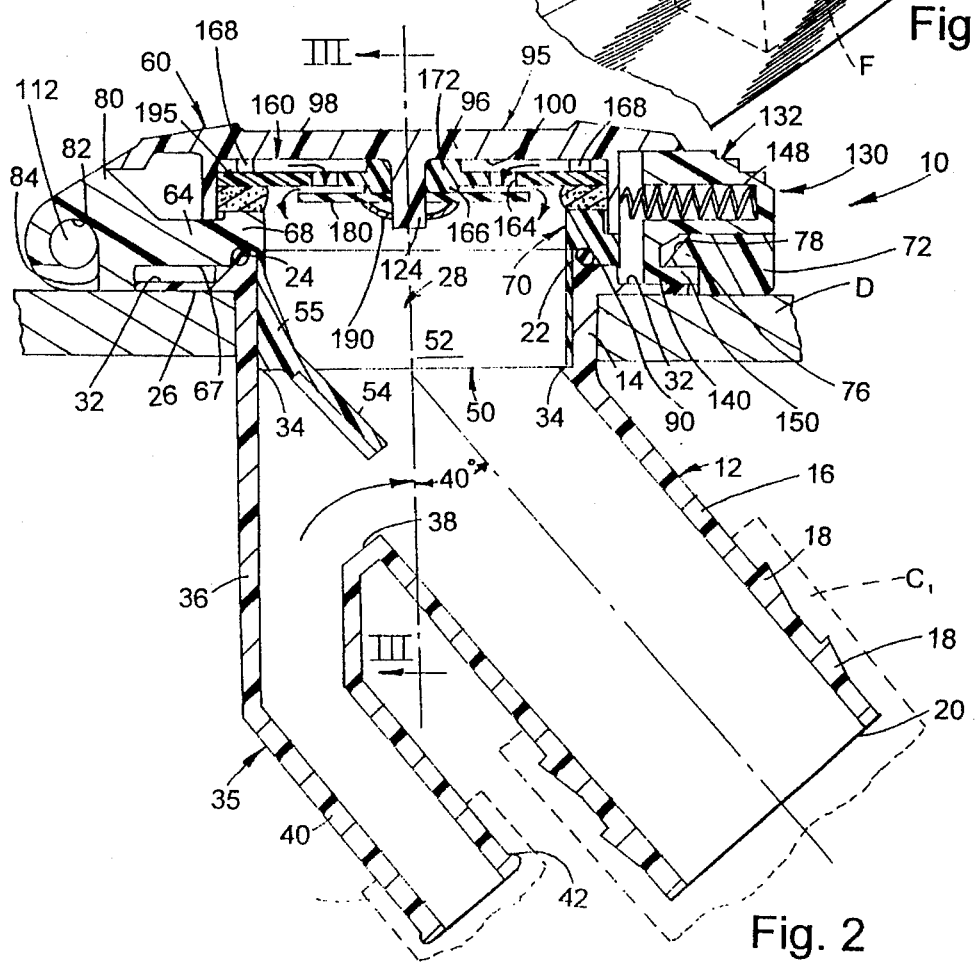

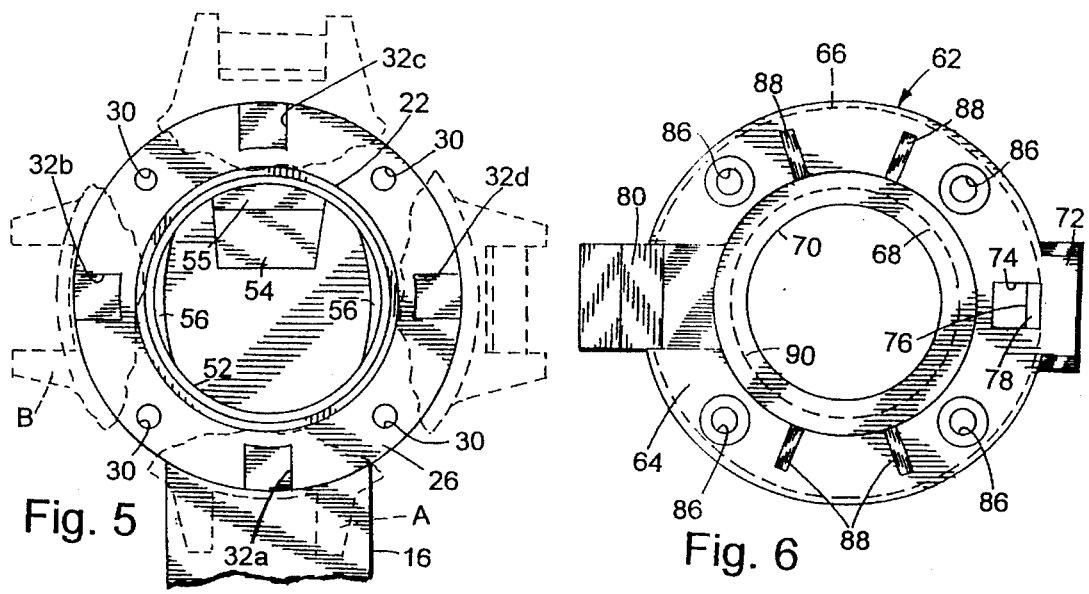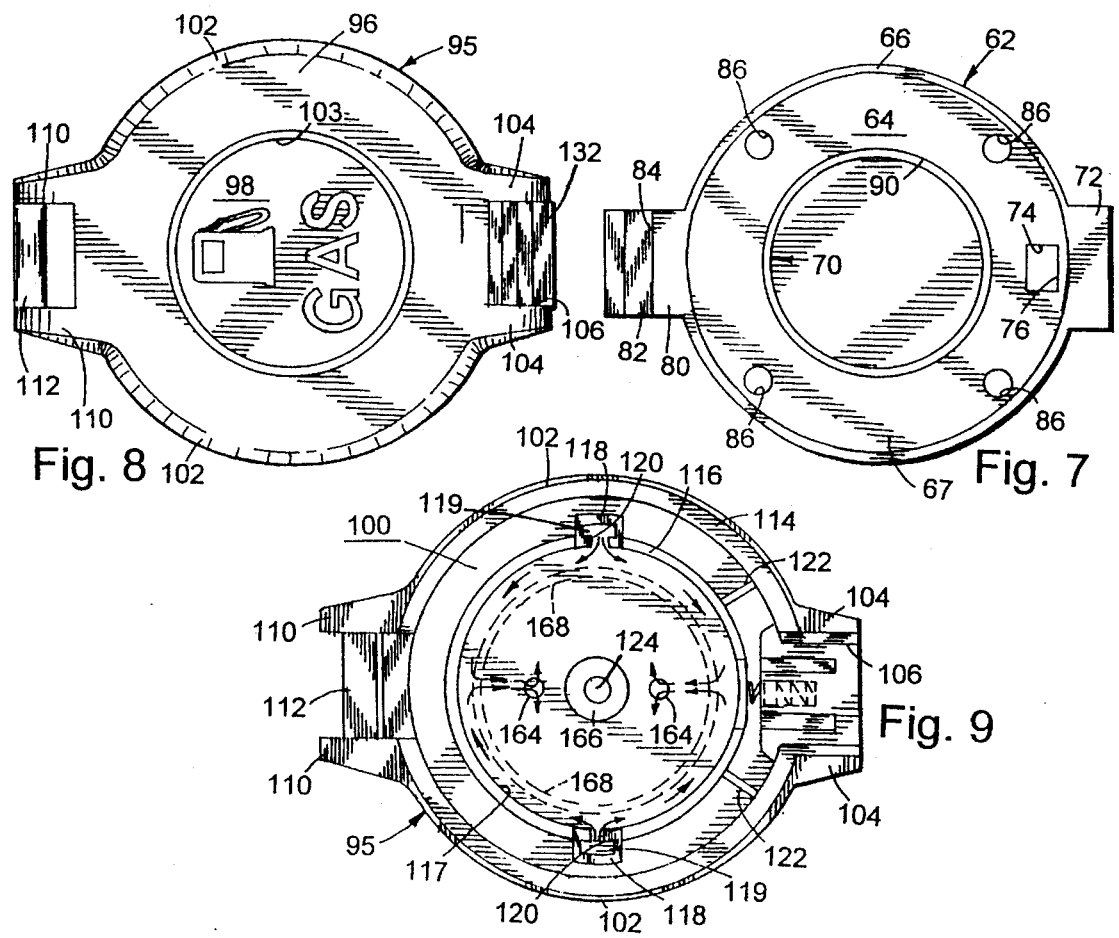

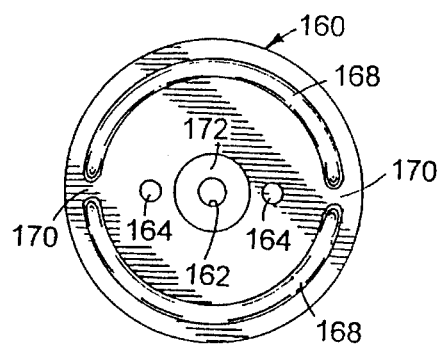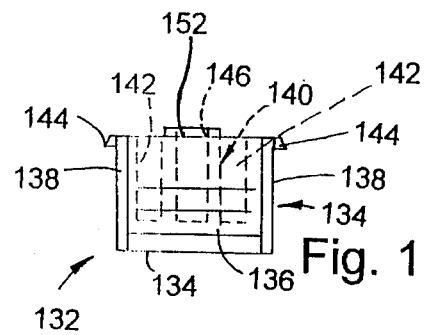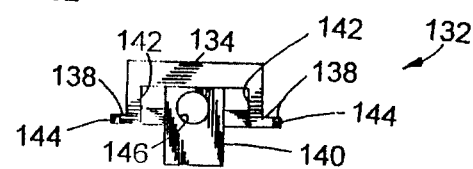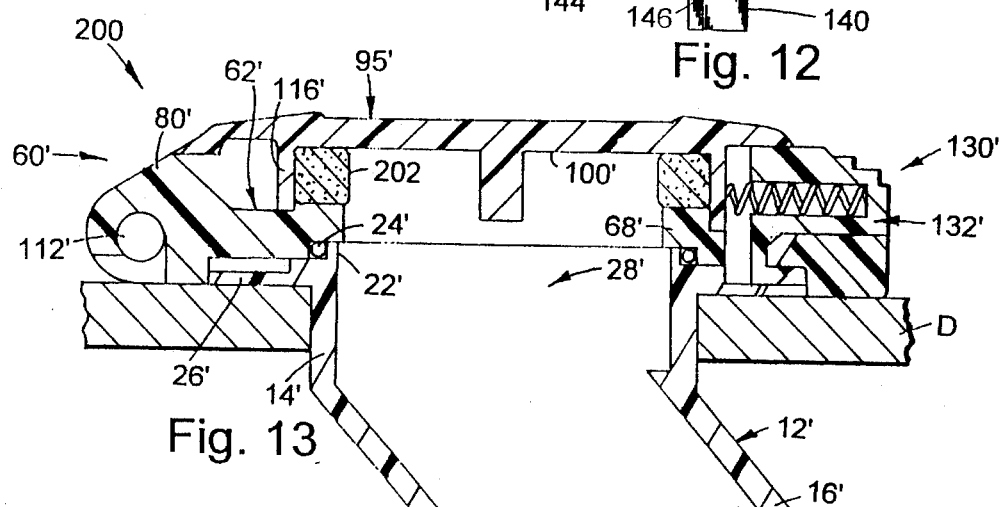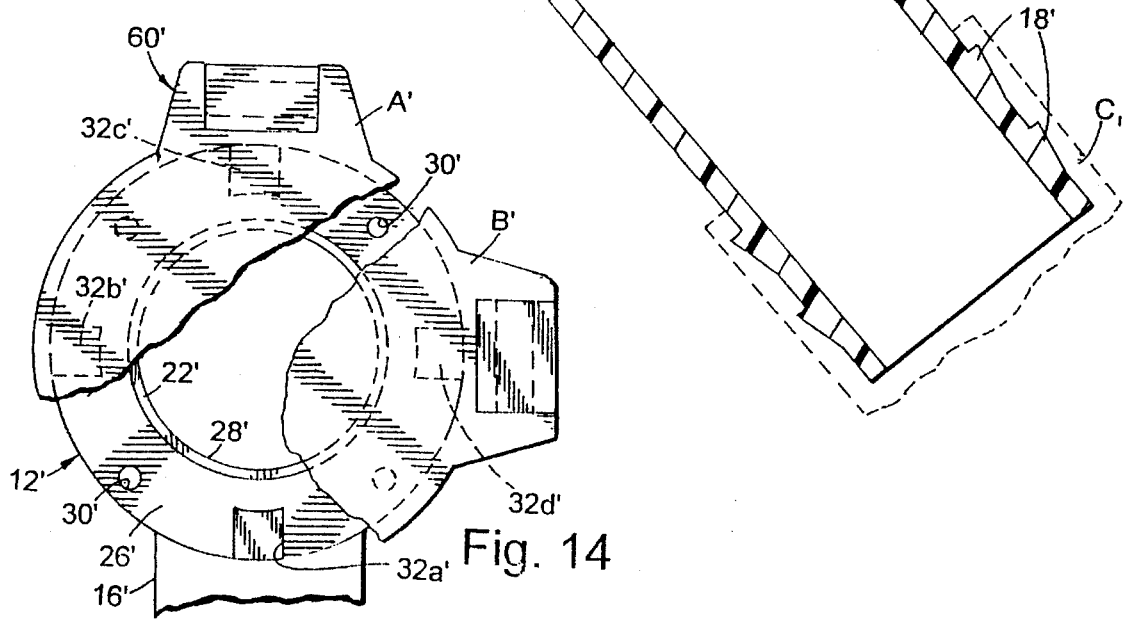

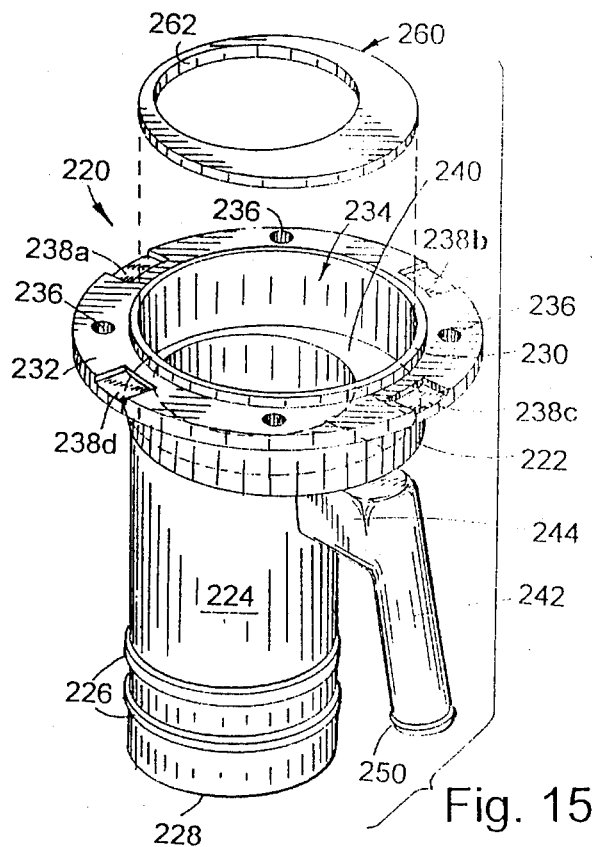
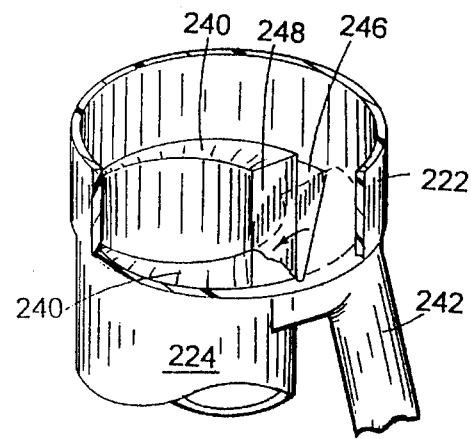
Fig. 16
Fig. 15
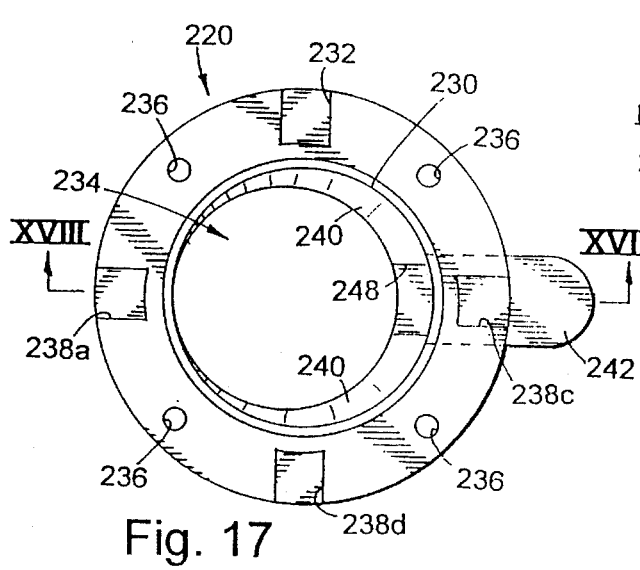
Fig. 17
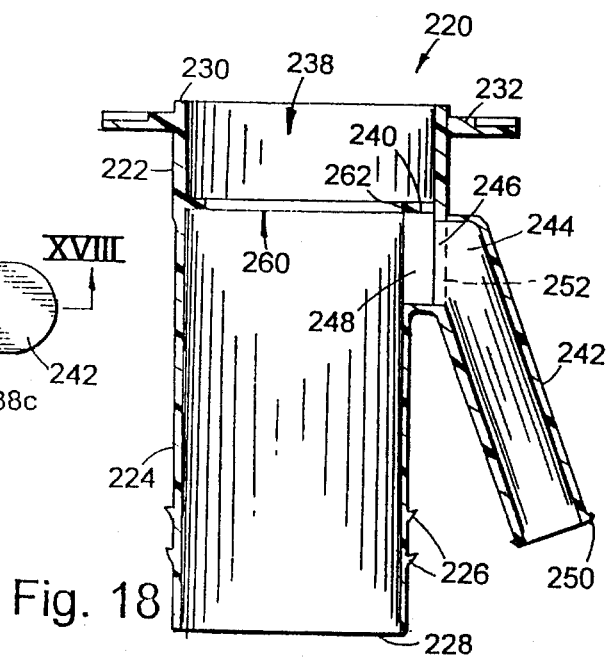
Fig. 18

FUEL FILL DEVICES FOR BOATS

CROSS-REFERENCE TO RELATED APPLICATION

This application is a continuation-in-part of pending U.S. patent application Ser. No. 08/215,264, filed Mar. 21, 1994.

FIELD OF THE INVENTION

This invention relates to fuel fill devices for liquid fuel tanks and, more particularly, to a fuel filling assembly especially adapted for use in boats or other marine applications wherein liquid fuel such as gasoline must be regularly inserted in a tank through a hull or other support structure while avoiding water ingestion and environmental contamination.

BACKGROUND OF THE INVENTION

Fuel tanks for boats and other marine applications are closed to prevent leakage of hazardous fumes, are typically mounted in enclosed areas, and, therefore, require venting to the atmosphere for pressure equalization, fuel vapor release and overfill release to meet required United States Coast Guard and other governmental safety requirements. For refilling, a through-deck fitting is typically provided and connected to the tank by a fluid hose or conduit. For ventilation, fuel tanks have typically used a vent tube separate from the filling device and connected by a hose or tube to a separate through-hull vent fitting. Such vents have usually been positioned on the side of the boat hull and are, thus, prone to water splashing which can contaminate the fuel in the tank if not trapped, or allow release of fuel into the water if the tank is overfilled causing environmental contamination.

Attempts have been made to combine a vent tube with a filling device and a closure cap. In the event the fuel tank is overfilled with one such device, fuel is directed outwardly and splashes through the fill opening thereby contaminating the boat, pump operator or environment. In addition, such devices have located the closure in one position with respect to the fill and vent tubes such that placing the filling device in a confined deck or hull area or making connections to a tank which is not directly aligned with the filling device is difficult.

A further problem encountered during the use of combined vent and filling tube devices is fuel leakage due to splashing or sloshing during extreme boat movements, especially when the fuel tank is full or nearly full. Combined vent/fill tubes require some type of vent in the closure device to allow the tank to breath; but leakage through such a vent can often occur due to splashing, sloshing, or other fuel surges.

A need was, therefore, recognized for fuel filling devices for marine applications which would be adjustable and accommodate varied positions on a boat, would either prevent or reduce and restrict fuel leakage and environmental contamination during use, and would provide proper fuel tank venting without requiring a separate vent device. The present invention provides a solution for this need and the above problems.

SUMMARY OF THE INVENTION

Accordingly, the present invention provides a fuel filling assembly for liquid fuel tanks especially on boats or other marine applications which may be adjusted for use in various positions on a boat in both vented or non-vented versions. In the non-vented versions, either an angled or straight fill tube and an adjustable closure cap allow use in differing boat configurations. In the vented versions, either the angled or straight fill tube and the adjustable closure cap are also provided along with an integral vent tube. Fuel leakage through a vented closure cap is restricted by the inclusion of either a flexible valve member forming a surge valve preventing the escape of fuel during extreme boat movements, or a rigid shield which obstructs and deflects fuel to restrict the escape of fuel during such boat movements.

In one form, a fuel filling assembly for liquid fuel tanks includes a fill tube adapted for connection to a fuel tank by a fluid conduit and having a tubular neck, a mounting means for mounting said fill tube on a support, and a fuel fill opening to the neck. A closure cap is mounted on the fill tube and adapted to restrict the ingestion of water or other contaminants into the fill tube and prevent the escape of fuel through the fill tube opening. A hinge for pivoting the closure cap between open and closed positions is also provided. A positioning member is included for locating the closure cap at one of a plurality of positions on the fill tube whereby the cap is positioned to open and close in a predetermined direction on the hinge.

In a preferred form, the positioning member is an annular flange having a fastening aperture therethrough, while the fill tube includes a second annular flange having a plurality of fastening apertures adapted to register successively with the first aperture to provide a plurality of positions in which the closure cap can be secured with respect to the fill tube. A latch assembly for securing the closure cap over the fill tube opening includes a latch portion received in one of a series of spaced recesses in the annular flange to facilitate location of the closure cap. The fill tube may be angled or straight.

In another form, the invention is a fuel filling and venting assembly for a liquid fuel tank comprising a fill tube adapted for connection to the fuel tank by a fluid conduit and having an opening and a mount for mounting the fill tube on a support. A vent tube adapted for connection to the fuel tank by a separate fluid conduit is joined in fluid communication with the fill tube adjacent the fill tube opening. The vent tube allows venting of the fuel vapor from the fuel tank and admission of atmospheric air to the tank through the fill tube opening while returning liquid fuel overflow to the tank through the fill tube. A closure cap is mounted on the fill tube for closing and opening the fill tube opening. In addition, an air passageway is provided in the closure cap operable to pass air and fuel vapor to and from the fill tube opening while restricting ingestion of water and other contaminants. The closure cap includes a flexible member forming a valve closing the air passageway in the closure cap upon contact by liquid fuel during a fuel surge.

Alternately, in the above assembly, the closure cap includes a rigid member forming a shield over the air passageway in the closure cap to restrict the escape of liquid fuel from the assembly during a fuel surge.

In these modified forms of the invention, a baffle is preferably included in the fill tube to prevent expulsion of fuel from the vent tube out of the fuel fill opening when the closure cap is in open position. A tortuous fluid path is preferably included in the closure cap and communicates with the air passageway to allow tank venting while restricting ingestion of water or other contaminants into the tank. Preferably, the flexible member is a thin rubber disc spaced closely below an opening to the air passageway and adapted to flex and close that opening during a fuel surge.

In the alternate version, the rigid member can be one of two embodiments of a non-flexible shield. A first embodiment includes a rigid disc having an annular wall spacing the disc from the cap interior and a peripheral flange which engages a sealing ring on the cap interior. The peripheral flange has one or more openings for fluid communication between the cap air passageway and the fill tube and vent tube. A second embodiment of the rigid shield member is a thin, rigid disc or washer spaced closely below an opening to the air passageway and adapted to cover and restrict fuel entry into that opening during a fuel surge.

In yet other aspects of the invention, a hinge between the closure cap and fill tube allows pivoting the closure cap between open and closed positions. Preferably, the hinge includes a first hinge member having an elongated opening for receiving the full length of a hinge pin and being positioned on one of the closure cap or a base member mounted on the fill tube. The other of those members includes an integral hinge pin received in the elongated opening. The need for a separate, individually inserted hinge pin between the pivoted members is eliminated.

The present fuel filling assembly provides numerous advantages over prior known devices. The invention provides both vented and non-vented, sealed versions each including a closure cap which may be located in one of numerous positions with respect to the fill tube for ease in placement and use on a boat, especially when the fill tube is angled or vented. In the vented version, a vent tube joins the fill tube in one unit and incorporates a closure cap having a tortuous vent passageway restricting ingestion of water or other contaminants while allowing continuous tank ventilation for fuel vapor removal and atmospheric pressure equalization. Yet, fuel leakage during splashing or sloshing from fuel surge during extreme boat movements is prevented or reduced by the inclusion of either an anti-splash surge valve in the closure cap, or a rigid shield member which covers openings to the vent passageway in the closure cap. Expulsion of fuel during tank filling due to overfill is restricted by the inclusion of a baffle over the vent tube opening to direct fuel back into the fill tube and tank. The filling assembly is adapted for low-cost manufacture and reliable, long-term operation, is molded from fuel, weather and impact resistant resinous materials which eliminate the need for electrical grounding. A simplified hinge design incorporating a molded hinge pin reduces assembly procedures. In both versions, the hinge avoids cap twisting, special keys for cap removal or losing the cap overboard. A positive latch is included for easy opening and secure closure. Manufacture of both the vented and non-vented, sealed versions from the same molds is also possible, thereby further reducing costs.

These and other objects, advantages, purposes and features of the invention will become more apparent from a study of the following description taken in conjunction with the drawings.

BRIEF DESCRIPTION OF THE DRAWINGS

FIG. 1 is a fragmentary, perspective view of the stern of a boat including an internal fuel tank and the fuel filling and venting assembly of the present invention;

FIG. 2 is a sectional, side elevation of the fuel filling and venting assembly taken along plane II—II of FIG. 1;

FIG. 3 is a sectional, front elevation of the fuel filling and venting assembly of FIGS. 1 and 2 taken along plane III—III of FIG. 2;

FIG. 5 is a top plan view of the fill neck tube incorporating the flow diverting baffle of the present invention;

FIG. 6 is a top plan view of the base plate and hinge member for mounting the closure cap of the present invention;

FIG. 7 is a bottom plan view of the base plate and hinge member shown in FIG. 6;

FIG. 8 is a top plan view of the closure cap of the present invention;

FIG. 9 is a bottom plan view of the closure cap with the flexible surge valve disc and retaining clip removed;

FIG. 10 is a top plan view of the rigid washer for forming an air passageway in the closure cap of the present invention;

FIG. 11 is a top plan view of the latch member for use in the closure cap of the present invention;

FIG. 12 is a rear elevation of the latch member shown in FIG. 11;

FIG. 13 is a sectional, side elevation of an alternative fuel filling assembly embodiment of the present invention;

FIG. 14 is a top plan view of the fill tube neck of the fuel filling assembly of FIG. 13, illustrating the adjustable positions of the closure cap thereon;

FIG. 15 is a an exploded, perspective view of a second alternative, vented fuel filling tube embodiment for use in the present invention;

FIG. 16 is a fragmentary, perspective view of a portion of the vented fuel fill tube of FIG. 15;

FIG. 17 is a top plan view of the vented fuel fill tube of FIGS. 15 and 16 not including the baffle washer; and FIG. 18 is a sectional side elevation of the vented, fuel fill tube of FIGS. 15–17 including the baffle washer and taken along plane XVIII—XVIII of FIG. 15.

DESCRIPTION OF THE PREFERRED EMBODIMENTS

Fuel Filling and Venting Embodiment

Figure 4:
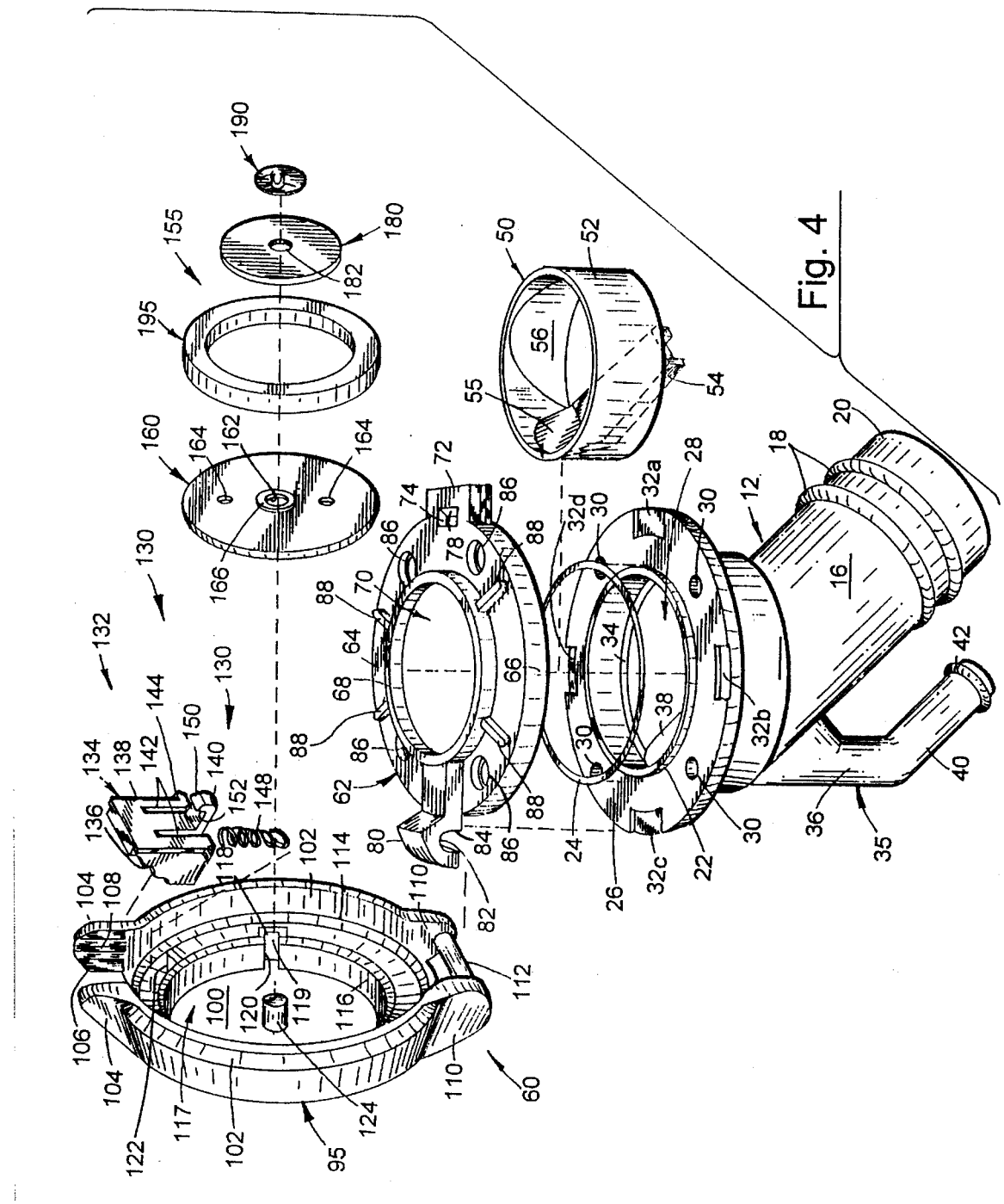
FIG. 4 is an exploded, perspective view of the fuel filling and venting assembly of FIGS. 1–3.

Referring now to the drawings in greater detail, FIGS. 1–4 illustrate a first embodiment 10 of the fuel filling assembly or fuel fill of the present invention. Fuel fill 10 includes a fuel fill tube 12, a fuel tank vent tube 35 joined in fluid communication with fill tube 12, and a closure cap assembly 60 having a closure cap 95 preferably hinged for movement between open and closed positions with respect to the opening to fill tube 12. As shown in FIG. 1, fuel filling assembly 10 is adapted for mounting on the deck D of boat B such that the fill tube 12 and vent tube 35 extend downwardly through an opening in the deck. Typically, fuel tank F is positioned within the interior of boat B and separate flexible fluid hoses or conduits C1 and C2 extend from fuel tank F and are telescoped over the terminal ends of fill tube 12 and vent tube 35 as shown in FIG. 2. As will be apparent from the following description, the angled positions of the fill tube 12 and vent tube 35 help position fuel hoses C1, C2 in a gradual curvature enabling faster fill and reducing fuel spillage during the filling procedures. Such angled positioning also allows location of the fuel filling assembly 10 in a greater number of places on the boat while enabling proper connection to a fuel tank. As is also explained more fully below, closure cap 95 may be positioned at one of several positions with respect to the angled vent tube 35 and/or fill tube 12 to accommodate a greater number of mounting positions on various boats.

As is best seen in FIGS. 2–4, fill tube 12 includes a cylindrical neck 14 and a downwardly depending, angled terminal portion 16 including a pair of spaced, annular fuel hose retaining barbs or rings 18 therearound adjacent the terminal end 20. At the upper end of neck 14 is a thin, upstanding rim or ring 22 providing a seat for a sealing O-ring 24 as described hereinafter. Alternately, rim 22 may be extended to seal against sealing gasket 195 or 312, thus allowing elimination of sealing O-ring 24 as shown in FIGS. 19, 20, 24 and 25 and as more fully explained below. A generally planar, annular mounting or neck flange 26 extends laterally outwardly to engage and support the fill tube 12 on deck D adjacent the deck opening. Together, rim 22 and neck 14 define a neck opening 28. A plurality of fastening apertures 30 are provided in flange 26, preferably at four equally spaced positions, for receipt of screws or other fasteners from the closure cap base member for secure mounting of the assembly to the deck D as described hereinafter. In addition, a plurality of rectangular recesses 32a–32d open outwardly to the periphery of flange 26, preferably at four equally spaced positions, for receipt of a portion of latch assembly 130 on closure cap 95 as described hereinafter. A circumferential shoulder 34 (FIGS. 2 and 3) extends around the interior of neck 14 to support a baffle 50 as explained below.

Joined integrally with fill tube 12 is vent tube 35 including upper portion 36 depending downwardly from neck 14 and the upper portion of angled fill tube 16 and defining an elongated vent tube opening 38 communicating with the interior of tube 12 as shown in FIGS. 2 and 3. The lower, terminal portion 40 of vent tube 35 also extends at an angle to the neck opening 28 and is preferably parallel to fill tube portion 16 as shown in FIG. 2. Fill tube portion 16 and vent tube portion 40 preferably extend at an acute angle of about 40° to the central axis of opening 28. Other angular positions are, of course, possible as desired. A barb or rib 42 is included on terminal portion 40 of vent tube 35 for retaining vent hose C2 telescoped thereover as shown in FIG. 2.

As is also shown in FIGS. 2–4, a baffle or shield 50 is fitted within opening 28 of neck 14 to prevent expulsion of liquid fuel from vent tube 35 and vent opening 38 out of opening 28 in case of tank overfilling. Baffle 50 includes a cylindrical body 52 having a height generally equivalent to the length of neck 14 and a downwardly depending deflecting shield or flange 54 molded integrally therewith. Flange 54 is generally U-shaped in cross section to provide sufficient rigidity and strength to deflect liquid fuel flowing upwardly out of opening 38 from vent tube 35 and redirect the fuel laterally and downwardly into fill tube 12 for return to the fuel tank as shown in FIG. 2. As is best seen in FIGS. 2 and 3, the upper portion 55 of flange 54 has a solid wedge shape extending outwardly from the inner surface of body 52 while the sides 56 of the cylinder are also wedge shaped and have a thickness at their lower ends matched to and corresponding to the width of shoulder 34 on the inner surface of fill tube 12. Preferably, the outer diameter of cylindrical body 52 of baffle 50 is sufficiently large to provide a friction fit with the inner surface of neck 14 to hold baffle 50 in place on shoulder 34 as aided by the closure cap assembly described below. Alternately, baffle 25 may be secured to shoulder 34 with fasteners as described more fully below in connection with FIGS. 19, 20, 24 and 25. Fill tube 12 and opening 28 with baffle 50 installed are sufficient in size to accept standard sized fuel pump fill nozzles, usually one inch or less in diameter.

As is also seen in FIGS. 2–4, closure cap assembly 60 is fitted over the upper end of neck 14 and neck flange 26 to open and close fill tube opening 28 for tank filling with a nozzle from a fuel pump. Closure cap assembly 60 includes a base or positioning member formed by plate 62, adapted to fit over and be received on neck flange 26, a closure cap 95 including an integral hinge pin 112 adapted for receipt by hinge member 80 on base member 62, a latch assembly 130 for closing cap 95 over fuel fill opening 28 by engaging base member 62, and a surge valve assembly 155 and sealing gasket 195 adapted to prevent fuel escape and leakage from splashing and sloshing of liquid fuel against the interior of cap 95 during extreme boat movements or the like.

Base member 62 (FIGS. 2–4, 6 and 7) includes a generally planar, annular flange 64 having a downwardly depending annular rim 66 at its outer periphery forming an annular recess 67 on its underside for receiving neck flange 26. An upstanding annular lip 68 defines an opening 70 extending through the base member and is adapted to mate and register with neck opening 28. A latch flange 72 projects radially outwardly from the outer periphery of flange 64 at one position of the base member circumference, flange 72 including a latch opening 74 and a keeper 76 at one edge of opening 74 having an inclined upper surface 78 which engages a latching hook 140 from latch assembly 130 as explained below. Diametrically opposite latch flange 72 is a raised hinge member 80 molded integrally with base member 62 to include a curved hinge pin bearing surface 82 and an elongated opening 84 providing access to that bearing surface. A series of four equally spaced fastener receiving apertures 86 extend through flange 64 at positions offset from hinge member 80 and flange 72, while four water diverting walls or fingers 88 are molded integrally on the top surface of flange 64 extending radially outwardly from the side of lip 68. As shown in FIG. 7, an annular recess 90 adapted to receive O-ring 24 when base member 62 is mounted over neck flange 26 outlines opening 70 on the underside of base member 62.

Referring again to FIGS. 2, 3, and 4, closure cap 95 is a hollow, disc-like member including top wall 96 having exterior surface 98 and interior surface 100 and a downwardly depending, annular rim 102 at the outer periphery of top wall 96. Outer surface 98 preferably includes a circular or other shaped recess 103 in which indicia such as a fuel symbol for gasoline and/or "gas" or other appropriate descriptive wording may be imprinted or molded to indicate the purpose of the fuel filling assembly. At one radial position on cap 95 a pair of latch flanges 104 define a latch member receiving opening 106. Latch flanges 104 each include a slot 108 for receiving latch member 132 as described below. Diametrically opposed to latch flanges 104 are a spaced pair of hinge pin mounting ears 110 between which is integrally molded a cylindrical hinge pin 112. The interior surface of peripheral rim 102 includes an annular, step-like shoulder 114 providing clearance for an air passageway around the outer surface of flange 64 and rim 66 of base member 62 as described below. Radially inwardly from rim 102 and shoulder 114 is an upstanding, cylindrical wall 116 defining an air chamber 117 within cap 95. At two diametrically opposed positions 90° from latch flanges 104 and hinge flanges 110 are U-shaped walls 118 joined to the outside of wall 116 and defining air channels or conduits 119 opening into air chamber 117 through openings 120. Upstanding walls 122 (FIGS. 4 and 9) extend radially between annular wall 116 and the inner surface of shoulder 114 adjacent latch assembly 130 to restrict water entry through the latch area. A cylindrical post 124 extends away from inner surface 100 of cap 95 for mounting of the various parts forming the surge valve assembly 155 (FIGS. 2–4), or the rigid surge restricting shield (FIGS. 19–26), as explained hereinafter.

As is best seen in FIGS. 4, 11, and 12, latch assembly 130 includes a sliding latch member 132 including a molded body 134 having an inclined outer surface including step-like finger gripping ridges 136, outwardly extending slide flanges 138 along either side, and a downwardly protruding, J-shaped latch hook 140 defined by parallel, spaced recesses 142 extending into the rear and bottom surfaces of body 134. Each slide flange 138 includes an outwardly protruding stop 144 at its inner end. Stops 144 limit the outward sliding movement of latch member 132 in slots 108 between latch flanges 104 on cap 95. In addition, body 134 includes a cylindrical bore 146 in its rear surface for receiving metallic, coil spring 148 (FIGS. 2 and 4) when latch member 132 is slidably mounted in the closure cap. As will be understood from FIGS. 2 and 4, latch hook 140 includes an inclined surface 150 defining a latch surface 152. Inclined surface 150 is adapted to engage inclined surface 78 of opening 74 in base member 62 to cam latch member 132 inwardly against the biasing force of spring 148 until the closure cap 95 is in its fully closed position. Thereafter, the force of coil spring 148 urges latch member 132 outwardly away from center post 124 such that latch surface 152 engages the undersurface of keeper 76 to hold the closure cap in its fully closed position.

With reference to FIGS. 2, 3, 4 and 10, surge valve assembly 155 includes a rigid, air passageway disc or washer 160 having a circular periphery, a center aperture 162 adapted for telescoping the disc over center post 124 and a pair of air passageway openings 164 spaced radially outwardly along one diameter from center aperture 162. On one generally planar side surface of disc 160 is a raised, annular ring 166 adjacent aperture 162 adapted to space flexible washer valve 180 a small distance away from disc 160 for proper air/fuel vapor flow. Preferably, ring 166 has a height of about 0.020–0.025 inches. On the opposite or inner side of disc 160 is an annular ridge 168 having a pair of opposed spaces or gaps 170 aligned with openings 164 on the same diameter, as well as a raised ring 172 having a height matching the height of ridges 168 as shown in FIG. 3 for spacing disc 160 outwardly from the interior surface 100 of cap 95 to form an air passageway therebetween inside chamber 117.

Received over disc 160 on center post 124, and spaced outwardly therefrom by annular ring 166, is a thin, flexible, resilient washer 180 (FIG. 4) having a center opening 182 for receiving center post 124 therethrough, and a circular outer periphery having a diameter smaller than disc 160 but sufficiently large to extend beyond spaced air passageway openings 164 as shown in FIGS. 2 and 4. A plastic or metallic retainer such as Tinnerman clip 190 is telescoped over post 124 to hold valve disc 180 against ring 166 and ring 172 against interior surface 100 of cap top wall 98 while maintaining an air space between the outer surface of disc 160 and the inner surface of valve disc 180.

The final element of the assembly is a resilient, annular sealing ring or gasket 195 fitted adjacent the interior of annular wall 116 over and adjacent the outer periphery of rigid washer 160. Preferably, annular seal or gasket 195 is formed from a foamed gasket material preferably a blend of nitrile and neoprene rubber sold under ENSOLITE™ by Uniroyal Incorporated of Middlebury, Conn. When closure cap 95 is fully closed and latched by latch assembly 130, as shown in FIGS. 2 and 3, seal or gasket 195 is compressed between the outer surface of disc 160 and the top surface of lip 68 on base member 62 to prevent escape of fuel or the entrance of water or air therebetween. Seal 195 is positioned in opposition to ridge 168 on the opposite surface of disc 160 to fully support disc 160 in the outer peripheral region and prevent it from flexing inwardly during compression of the gasket seal as shown in FIGS. 2 and 3.

Accordingly, assembly and operation of the fuel filling and venting assembly 10 will now be understood. O-ring 24 is placed over and around lip 22 on fill tube 12 such that it rests against flange 26. Baffle 50 is then telescoped within the neck opening 28 such that deflecting flange or shield 54 is positioned over vent opening 38 within the fill tube. Thereafter, closure cap 95 is assembled to base member 62 by fitting integral hinge pin 112 through opening 84 against bearing surface 82 of hinge member 80. Either prior to or subsequent to such assembly, latch member 132 is assembled between latch flanges 104 by flexing the sides of body 134 inwardly into recesses 142 such that stops 144 pass through slots 108 and spring outwardly to engage at the rear surfaces of the slots. Coil spring 148, already located in bore 146, engages against the outer surface of annular wall 116 to urge latch member 132 radially outwardly until stops 144 prevent further movement.

With closure cap 95 still open, rigid washer or disc 160 is telescoped over center post 124 after positioning openings 164 and gaps 170 at 90° to openings 120 from air channels 119. Thereafter, flexible, resilient valve disc 180 is telescoped over post 124 followed by retainer clip 190 to hold the valve and disc in their spaced positions against one another and the interior surface 100 of cap 95. Finally, annular seal or gasket 195 is positioned over disc 160 immediately adjacent the interior of wall 116.

Subsequently, closure cap assembly 60 including base member 62 is positioned on neck flange 26 of fill tube 12 in one of four desired positions. In the event the latch assembly is desired to align with angled tube portion 16, the latch hook 140 of latch member 132 is positioned in recess 32*a* shown as position A in FIG. 5. In such position, fastener apertures 86 in flange 64 of base member 62 align with fastener openings 30 in neck flange 26 while latch hook 140 prevents further rotation by extending into the recess 32*a*. Fasteners, such as screws, may then be received through each of the aligned sets of fastening apertures to secure the entire assembly to the boat deck.

Alternately, should a different position for closure cap assembly 60 be desired with respect to the angled portion 16 of fill tube 12, assembly 60 may be successively rotated in 90° increments into alignment with recess 32b, 32c or 32d, respectively, as shown in FIG. 5, to allow the hinged closure cap 95 to pivot open in a desired direction with respect to the angled extension of fill tube portion 16 and angled vent tube 40. In each position, fastener apertures 86 are successively aligned with apertures 30 in the different positions while latch hook 140 is received in recess 32b, 32c or 32d, respectively. Thus, each aperture 86 is in registry with a different one of apertures 30 as the cap assembly is rotated to each successive position.

Once installed on a boat deck, the space below hinge pin 112 at opening 84 is smaller than the diameter of the hinge pin thereby trapping the hinge pin and preventing removal of the closure cap from the installed assembly. This prevents inadvertent loss of the cap during filling. Closure cap 95 is opened by pressing latch member 132 inwardly against the force of spring 148 until latch surface 152 of latch member 140 clears the undersurface of keeper 76 allowing the cap to be pivoted to its open position. The resiliency of seal or gasket 195 urges cap 95 upwardly away from the fill tube opening during such procedure. Baffle 50 is trapped between the overhanging edge of lip 68 of base member 62 and shoulder 34 of fill tube 12 preventing its axial movement within the fill tube while retaining deflecting flange 54 over vent opening 38 to prevent fuel expulsion upon overfill. O-ring 24 prevents escape of fuel or entry of water or air between base member 64 and fill tube 12 and flange 26.

Preferably, fill tube 12, baffle 50, base member 62, closure cap 95, latch member 132 and washer disc 160 are all molded from a fuel resistant, impact resistant, ultraviolet radiation stabilized resinous material, such as glass-filled polypropylene having a glass fill within the range of 10 to 40 percent. Most preferably, 20 percent glass-filled polypropylene is used including either a conventional UV stabilizer additive prior to molding or carbon black in the event the color of the molded product is desired to be black. Carbon black also provides UV stabilization in the polypropylene. Alternately, other resinous materials, such as nylon or acetal, may be used for molding these parts. O-ring 24 is preferably nitrile rubber with a preferred durometer of 70 or, alternately, could be formed from neoprene rubber or other synthetic materials. Likewise, flexible valve disc 180 is preferably formed from a fuel resistant rubber material such as nitrile rubber having a durometer within the range of 50 to 70 and a preferred thickness of 0.062 inches. Alternately, neoprene rubber could also be used for disc 180.

After installation on a boat deck, latch member 132 can be moved inwardly to release the latch from keeper 76 and allow pivotal opening of closure cap 95 about hinge pin 112. Fuel may then be inserted into tank F through fill tube 12 and angled portion 16. During filling, fuel vapors pass upwardly through vent tube 35 and vent opening 38 and out fill tube opening 28 to the atmosphere. Should overfilling occur, and liquid fuel fill the vent tube and flow out of vent opening 38, flange 54 deflects the liquid fuel away from fill tube opening 28 into fill tube portion 16 thereby returning the fuel to tank F without contaminating the surrounding deck or water. Once filling of tank F is completed, closure cap 95 is pivoted closed and latched due to the camming action of surface 150 on keeper surface 78.

When closed, pressure within tank F will be relieved and atmospheric air admitted to the tank through the continuously open tortuous air passageway formed by the structure of the closure cap assembly described above. As shown in FIGS. 2, 3 and 9, air is admitted to fuel tank F by passing under rim 102 upwardly along rim 66 of base member 62 over flange 64 and into the bottom of air channel 119 which opens between water restricting walls or fingers 88. Thereafter, air passes upwardly through air channels 119 and laterally at 90° through openings 120 to the space between disc 160 and interior surface 100 of cap top wall 98. As shown in FIG. 9, the air then passes laterally at 90° around the outer edge of the outer surface of annular ridge 168 to gaps 170 where it flows radially inwardly to openings 64 and thereafter downwardly through those openings and between disc 160 and flexible valve disc 180 into the fuel fill tube neck opening 28 and into the fuel tank. This tortuous fluid path effectively prevents ingestion of water or other contaminants since they must pass upwardly in a succession of steps through air channels 119 between fingers 88 and around ridges 168 before passing laterally through gaps 170 and openings 164. Likewise, fuel vapors can escape from the tank to equalize pressure within the tank by following the reverse of this tortuous fluid path.

In the event of fuel surge caused by splashing or sloshing during extreme boat movements or the like, any liquid fuel passing upwardly through fuel tube 12 will strike flexible valve disc 180 and force it against the outer surface of disc 160 thereby closing openings 164 and preventing the escape of fuel through the air passageways. Likewise, sealing gasket 195 and O-ring 24 prevent the escape of fuel between the remaining parts of the assembly.

Alternate Fuel Filling Assembly

As shown in FIGS. 13 and 14, an alternate embodiment 200 of a fuel filling assembly of the present invention is illustrated. Assembly 200 differs from assembly 10 by the elimination of vent tube 35 and the tortuous air passageway/fluid path through the closure cap assembly. In addition, baffle 50 is eliminated because of the elimination of any vent opening 38 as contained in assembly 10. Further, a different sealing gasket 202 is substituted. Like parts are indicated by like numerals with the addition of a prime thereon as compared to assembly 10. With reference to FIG. 13, fill tube 12' includes neck 14' and neck flange 26' for mounting the fill tube on deck D of a boat. Neck 14' defines a fill tube opening 28' and includes an upstanding rim 22' about which is fitted O-ring 24' for sealing against base member 62' when fitted thereover. Lower portion 16' of fill tube 12' is positioned at an angle to the central axis of opening 28', preferably at an acute angle of 40° to that axis as was the case in assembly 10. Ribs or barbs 18' retain fuel tank filling hose or conduit C1 thereover as in assembly 10. Assembly 200 also includes a closure cap assembly 60', including base member 62', and closure cap 95' pivoted to base member 62' by hinge 80' including hinge pin 112'. A latch assembly 130', including a sliding, biased latch member 132', is included on closure cap 95' and operates in the same fashion as described above for assembly 10. Because of the elimination of vent tube 35 and vent opening 38 from fill tube 12', air flow and venting through closure cap 95' is unnecessary. Accordingly, rigid washer 160, flexible valve disc 180 and retainer clip 190 are eliminated and replaced by a thicker sealing gasket 202 positioned against the interior surface 100' of closure cap 95' and against the inside surface of annular wall 116'. Thus, when cap 95 is closed and latched with latch assembly 130', sealing gasket 202 is compressed against the top surface of rim or lip 68' on base member 62' to form a complete closure or seal, preventing the entry of water into the fill tube 12' or the escape of fuel from fill tube 12' after closure cap 95' is closed.

Fuel filling assembly 200 is installed in substantially the same manner as assembly 10 and includes the same adjustably positioned closure cap assembly 60' as in assembly 10. Hence, after fill tube 12' is inserted through an appropriate opening in deck D, base member 62' is rotated to the desired position with respect to the direction of extension of angled fill tube 16' and placed over neck flange 26' until the latch 140' of latch member 132' is positioned in one of the desired recesses 32a' through 32d', as shown in FIG. 14 and as explained above in connection with assembly 10 and FIG. 5. The fastening apertures in the base member flange 64' and neck flange 26' are thus aligned and may receive appropriate screws or other fasteners to secure the entire assembly to the deck D. Two of the four alternative positions of closure cap assembly 60', as described above, are shown in FIG. 14 as positions A' and B'. In the installation of assembly 200, since the assembly is closed and sealed upon closure of the cap 95', a separate vent tube leading to a separate vent positioned through the boat hull to the atmosphere is required. As will be apparent, fuel fill tube 12', O-ring 24', base member 62', closure cap 95' and latch assembly 130' may all be the identical, molded, glass-filled polypropylene parts as those included in assembly 10. Thus, manufacture using the same molds is possible thereby reducing costs and increasing efficiency for production of the two alternate versions 10, 200 of the fuel filling assembly. The only different part required for fuel filling assembly 200 is the slightly thicker sealing gasket 202 which is also preferably formed from blended foam of nitrile and neoprene rubber sold under ENSOLITE™ by Uniroyal Incorporated of Middlebury, Conn.

Alternate Fuel Filling Tube

Referring now to FIGS. 15–18, another form 220 of the fuel filling tube can be used with the closure cap assemblies 60, 60' depending on whether an integral vent tube joining the fuel filling tube is desired. Fuel filling tube 220 includes a cylindrical neck 222 and a downwardly depending, rectilinear or straight tube portion 224 including a pair of spaced, annular fuel hose retaining barbs or rings 226 therearound adjacent terminal end 228. At the upper end of neck 222 is a thin, upstanding rim or ring 230 providing a seat for sealing O-ring 24 as described above in connection with embodiments 10 and 200. A generally planar, annular mounting or neck flange 232 extends laterally outwardly to engage and support fill tube 220 on a deck adjacent the deck opening. Together, rim 230 and neck 222 define neck opening 234. A plurality of fastening apertures 236 are provided in flange 232, preferably at four equally spaced positions, for receipt of screws or other fasteners from the closure cap base member for secure mounting of the assembly to the deck as described above. In addition, a plurality of rectangular recesses 238a–238d open outwardly to the periphery of flange 232 preferably at four equally spaced positions, for receipt of a portion of latch assembly 130 or 130' on closure cap 60, 60' as described above. In addition, a circumferential shoulder 240 (FIGS. 16 and 17) extends partially around the interior of neck 222 to support a rigid washer 260 forming a baffle functioning similarly to baffle 50 in assembly 10.

Joined integrally with fill tube 220 is a vent tube 242 including an upper portion 244 extending laterally outwardly from neck 222 and defining an elongated, V-shaped, vent tube opening 246 communicating with the interior of tube 220 as shown in FIGS. 15 and 16. Vent tube opening 246 opens into a generally rectangular passageway 248 extending to the main, circular area of tube portion 224 below shoulder 240 as shown in FIG. 16. Vent tube 242 extends at an acute angle to the axis of tube neck 222 and tube portion 244 preferably at an angle within the range of about 20° to 30° to the central axis of those tube portions although other angular positions are possible if desired. A barb or rib 250 is included at the end of vent tube 242 for retaining a vent hose telescoped thereover as shown in FIG. 18.

As is also seen in FIGS. 15–18, a modified baffle or shield 260 is fitted transversely across and within opening 234 of neck 222 to partially close that opening and prevent expulsion of liquid fuel from vent tube 242 and vent opening 246 out of opening 234 in case of tank overfilling. Baffle 260 is a circular, generally planar, rigid washer which includes a circular opening 262 preferably offset in washer 260 such that its axis is aligned with the axis of tubular portion 224 as shown in FIG. 18. The outer circumference of baffle washer 260 is preferably matched to the interior diameter of neck portion 220 so as to be slidably received through but frictionally held in opening 234 on shoulder 240 shown in FIG. 18. Washer 260 may then be secured on shoulder 240 by sonic or spin welding, heat staking or another fastening method to hold it in place and resist displacement by the force of any fuel overfill. When in place, baffle 260 provides sufficient rigidity and strength to deflect liquid fuel flowing upwardly out of opening 246 from vent tube 242 and redirect the fuel laterally and downwardly into fill tube 242 for return to the fuel tank. Aperture 262 through baffle 260 is of sufficient size to accept standard size fuel pump fill nozzles, usually one inch or less in diameter.

A further modification of fill tube 220 can be used by eliminating vent tube 242 and closing the area including vent opening 246 by forming a wall 252 during the molding process as shown in FIG. 18. Wall 252 connects neck portion 222 with tube portion 224. In such event, baffle washer 260 may be eliminated. As with vent tubes 12 and 12', the vented and non-vented versions of alternate vent tube 220 may be molded in the same mold apparatus with slight alteration to form the wall 252 instead of vent tube 242.

In either its vented or non-vented versions, fuel fill tube 220 may be used with closure cap assemblies 60 or 60' as explained above in connection with assemblies 10 and 200. In the event the vented version of fuel fill tube 220 is used, closure cap assembly 60, shown in FIGS. 2–4, can be incorporated with base member 64 fitted over flange 232 providing the ability to position the closure cap or hinged opening in one of four positions provided by fastening apertures 236 and locating recesses 238a–238d as explained above. Similarly, for the non-vented version of fuel fill tube 220 including wall 252 instead of vent tube 242, closure cap assembly 60, as shown in FIG. 13, may be utilized since venting through the cap is unnecessary in such version. The same positioning adjustments and sealing arrangement with fill tube 220 are provided as with assemblies 10 and 200.

Fuel filling tube 220 and baffle washer 260 are both preferably molded from fuel resistant, impact resistant, ultraviolet radiation stabilized resinous material such as glass-filled polypropylene having a glass fill within the range of 10–40% as described above. Most preferably, a 20% glass-filled polypropylene is used including either a conventional UV stabilizer additive added prior to molding or carbon black in the event a black color for the molded tube is desired. As above, alternate resinous materials such as nylon or acetal may be used for such molding if desired.

Alternate Vented Closure Cap Assemblies

Referring now to FIGS. 19–23, another embodiment 300 of the fuel filling and venting assembly or fuel fill of the present invention is illustrated. Fuel fill assembly 300 differs from embodiment 10 by the elimination of flexible valve disc 180 and the inclusion of one of two alternate forms of a rigid shield member which maintains a continuously open, non-closing, air passageway through the closure cap and which obstructs and deflects liquid fuel during fuel surges caused by splashing or sloshing during extreme boat movements or the like. Alternate rigid shield members 310 and 352, together with the tortuous air passageway through the closure cap, restrict the escape of liquid fuel outside the assembly during such fuel surges. In addition, vented fuel fill assembly 300 includes a modified baffle 50' including additional securing fasteners for attaching it to the supporting shoulder 34 in neck 14 of a modified fill tube 12a which includes a modified rim or ring 22a. Like parts are indicated by like numerals to those in assembly 10.

The modified closure cap assembly 302 of vented fuel fill assembly 300 can be used with either the fill tube 12a including angled terminal portion 16a and angled vent tube terminal portion 40a or with an alternate fuel filling tube 220 of the type shown in FIGS. 15–18. Vented cap assembly 302 is preferably not used with alternate fill tube 12' inasmuch as tube 12' does not include any vent tube thereby eliminating the need for venting through the cap assembly.

Figure 19:
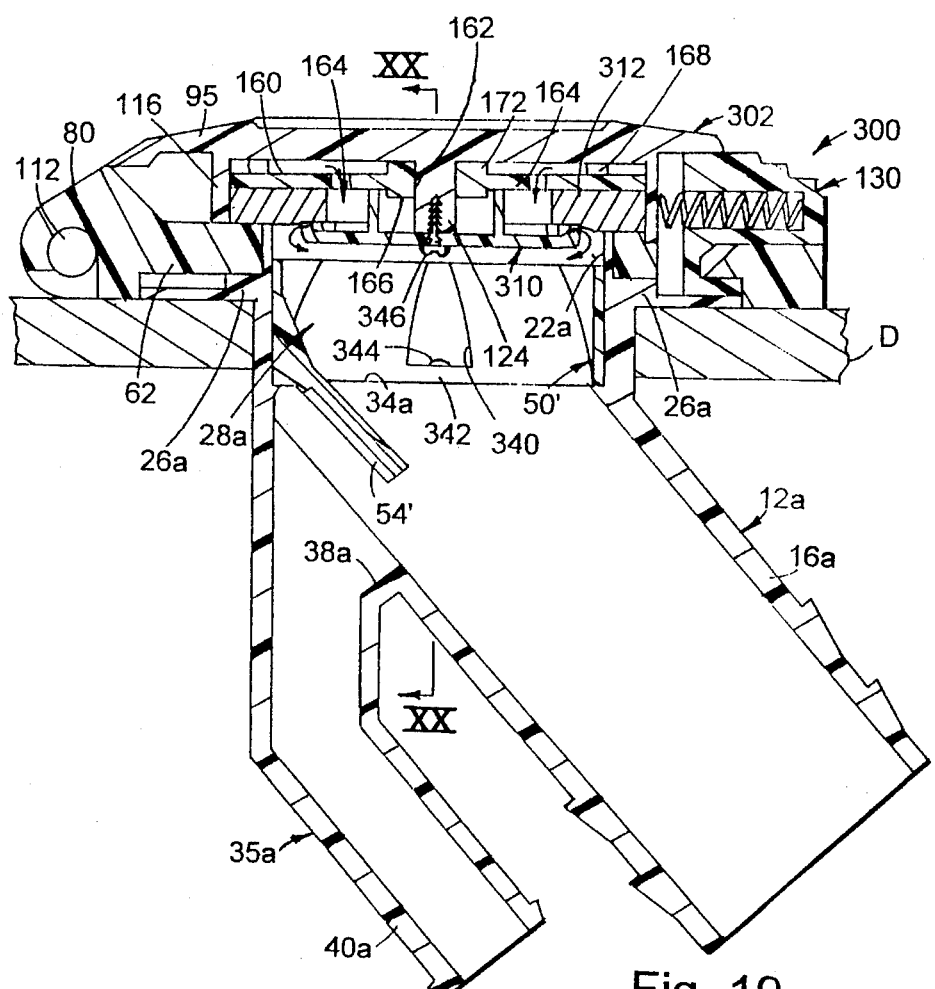
FIG. 19 is a sectional, side elevation of a third alternative, fuel filling and venting assembly for use in the present invention.
Figure 20:
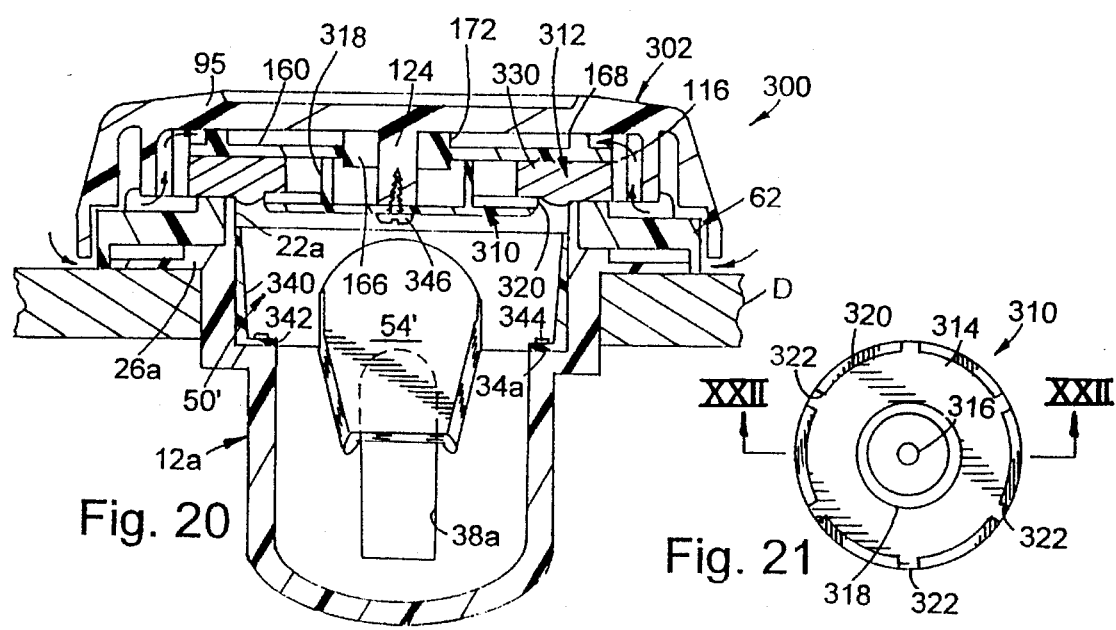
FIG. 20 is a sectional, front elevation of the fuel filling and venting assembly of FIG. 19 taken along plane XX—XX of FIG. 19.

As best seen in FIGS. 19 and 20, alternate cap assembly 302 includes base member 62, adapted to fit over and be received on neck flange 26a, a closure cap 95 including an integral hinge pin 112 adapted for receipt by hinge member 80 on base member 62, a latch assembly 130 for closing cap 95 over fuel fill opening 28a by engaging base member 62, rigid air passageway disc or washer 160, and a rigid shield member 310 and modified sealing gasket 312 adapted to restrict the escape of liquid fuel and leakage due to splashing and sloshing of the fuel against the interior of cap assembly 302 during extreme boat movements. Cap assembly 302 is identical to cap assembly 60 with air passageway disc or washer 160 fitted over center post 124 via center aperture 162, including a pair of air passageway openings 164 spaced radially outwardly along one diameter from center aperture 162, having a generally planar side surface with a raised annular ring 166 adjacent aperture 162, and an annular ridge 168 having a pair of opposed spaces or gaps 170 aligned with openings 164 on the same diameter and a raised ring 172 having a height matching the height of ridges 168 on the side of disc 160 opposite raised annular ring 166. Hence, disc 160 is spaced outwardly from the interior surface of cap 95 by ridges 168 and ring 172 to form an air passageway therebetween inside the cap as described above in connection with embodiment 10.

Figure 21:
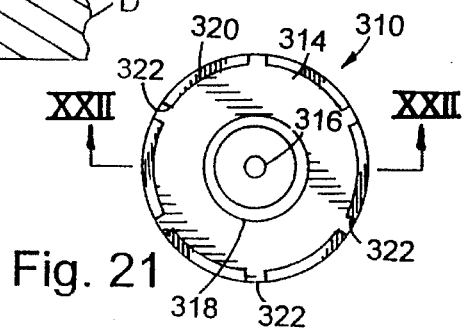
FIG. 21 is a bottom plan view of the rigid shield member incorporated in the fuel filling and venting assembly of FIGS. 19 and 20.
Figure 23:
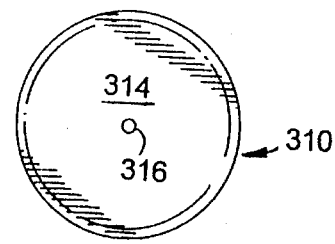
FIG. 23 is a top plan view of the rigid shield member of FIGS. 21 and 22.
Figure 22:
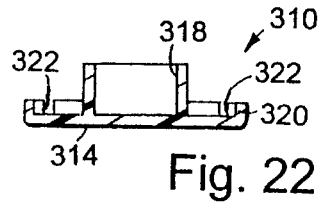
FIG. 22 is a sectional, side elevation of the rigid shield member taken along plane XXII—XXII of FIG. 21.

As is best seen in FIGS. 21–23, rigid shield member 310 is preferably molded from a fuel resistant, impact resistant, ultraviolet radiation stabilized resinous material, such as glass filled polypropylene having a glass fill within the range of 10–40%, and most preferably, 20% glass filled. The material may include carbon black and/or a conventional UV stabilizer additive prior to molding. Alternately, materials such as nylon or acetal may be used in molding this part. As shown in FIGS. 21–23, shield 310 includes a rigid disc 314 having a center aperture 316 and a continuous, annular wall 318 extending from one side of disc 314 and spaced radially outwardly from center aperture 316. Spaced radially outwardly of wall 318 on the same side of disc 314 is an annular flange 320 adjacent the outer periphery of disc 314. Flange 320 extends in the same direction as annular wall 318 and includes a series of equally spaced gaps or openings 322 providing air vents or passageways through the peripheral flange. Flange 320 helps rigidify the disc 314 and prevent it from flexing while providing additional strength.

As is best seen in FIGS. 19 and 20, sealing gasket 312 is similar to sealing gasket 195 but has a smaller center aperture 330 providing a radially wider surface area for the gasket. The thickness of gasket 312 is substantially the same as or gasket 195 such that it is fitted adjacent the interior of annular wall 116 within cap 95 over and adjacent the outer periphery of rigid washer 160 such that it is generally flush with the end of wall 116. As with gasket 195, annular seal 312 is preferably formed from a foamed gasket material such as a blend of nitrile and neoprene rubber sold under ENSOLITE™ by Uniroyal Incorporated of Middlebury, Conn.

Modified baffle 50' is substantially similar to baffle 50 except for the inclusion of fastening recesses 340 at diametrically opposed positions 90° offset from deflecting flange 54' and forming ledges or shoulders 342 through which fastening studs 344 molded integrally on an upstanding from shoulder 34a of fill tube 12a are received. Studs 344 are heat staked or formed over to hold the baffle 50' in place and prevent its rotation on shoulder 34, as well as its axial movement within the neck of fill tube 12a.

Fill tube 12a differs from tube 12 by inclusion of a higher rim or ring 22a which extends along the inner surface of lip 68 of base member 62 to a position flush with the upper surface of lip 68. Hence, gasket 312 engages and seals against both rim 22a and lip 68 when cap assembly 302 is closed, thereby eliminating the need for O-ring 24 which is preferably omitted from this embodiment.

Cap assembly 302 is assembled and operated with base member 62, baffle 50' and fill tube 12a in a manner substantially similar to that described above for embodiment 10. After rigid disc 160 is telescoped over center post 124, sealing gasket 312 is assembled inside annular wall 116 over the outer surface of disc 160. Thereafter, rigid shield member 310 is assembled over post 124 with annular wall 318 concentrically outside raised ring 166 such that center aperture 316 is aligned with an aperture in the center of the outer surface of post 124. A screw or similar fastener 346 is then inserted to retain the rigid shield in position. When fastened in this manner, rigid shield 310 is spaced from disc 160 over openings 164 by wall 318 while sealing gasket 312 extends sufficiently radially inwardly under flange 320 such that the edge surface of flange 320 engages and slightly compresses the sealing gasket 312. Openings 322 through flange 320 provide continuous air and vapor communication between openings 164 and fill tube opening 28a and, thus, the fill tube 16a and vent tube 35a which lead to the fuel tank when installed.

When assembled, with closure cap assembly 302 including base member 62 positioned on neck flange 26a of fill tube 12a in any one of the four desired positions as explained above in connection with embodiment 10, closure cap 95 may be pivoted closed via hinge pin 112 such that latch assembly 130 engages neck flange 26a with sealing gasket 312 sealingly engaged with and compressed by upstanding rim or ring 22a and lip 68. Fluid communication with the exterior of the fuel fill assembly is thus made through openings 322 in flange 320 of rigid shield 310, openings 164 in disc 160 and the remainder of the tortuous air passageway through the closure cap as explained above. Such communication will relieve pressure within fuel tank F and allow admission of atmospheric air to the tank while restricting ingestion of water from the outside of the boat. In event of fuel surge caused by fuel splashing or sloshing during extreme boat movements or the like, any liquid fuel passing upwardly through fuel tube 12a will strike rigid disc 314 of shield 310 which obstructs and deflects the fuel away from openings 164 causing it to return to the fuel tank through the fill tubes. In order to pass through openings 322, any fuel from tube 12a must change directions twice. Also, the engagement between gasket 312 and flange 320 further limits passage of fuel. In the event that any small amount of liquid fuel passes through openings 322, it will be trapped inside the rigid shield member and allowed to drain back to the fuel fill tube after the surge passes. In the event any small amount of fuel passes into openings 164, its passage out of the cap assembly will be restricted by the tortuous air passageway extending through the cap.

Figure 24:
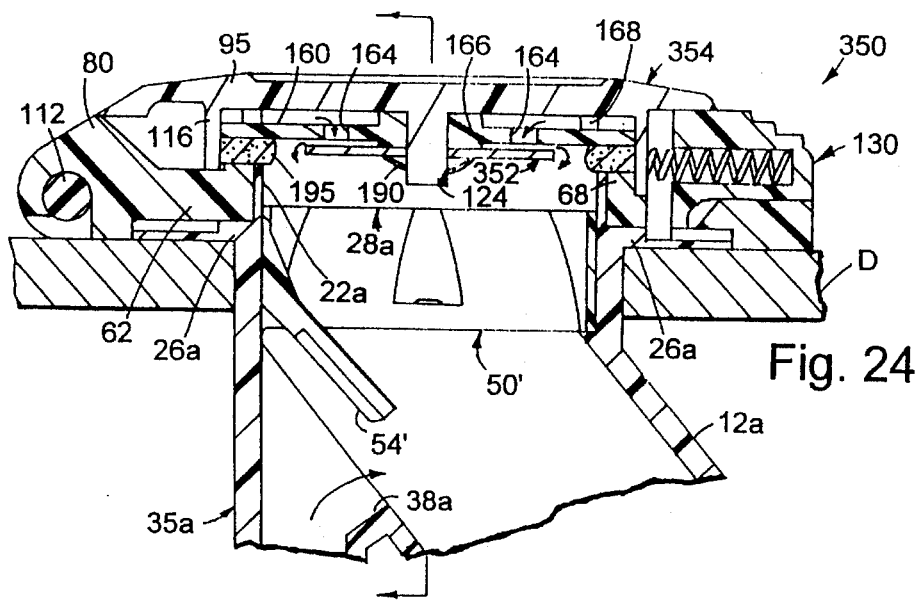
FIG. 24 is a sectional, side elevation of a fourth alternative fuel filling and venting assembly of the present invention.
Figure 25:
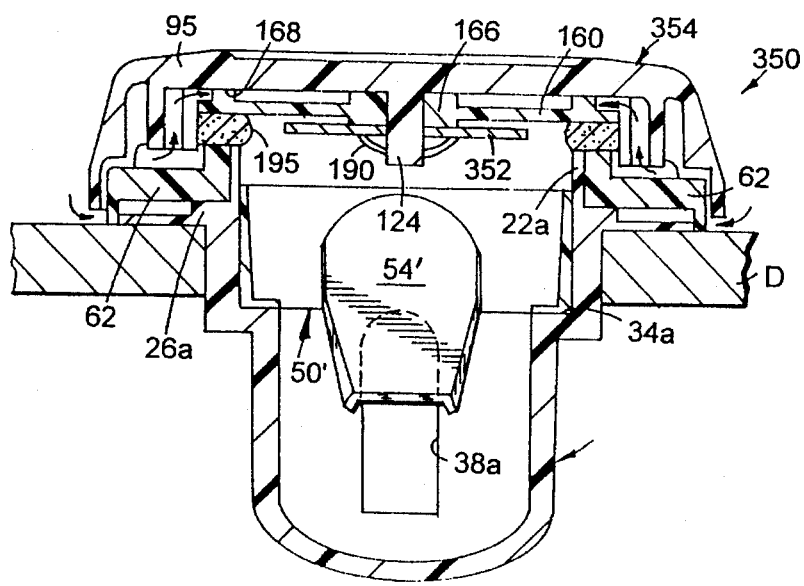
FIG. 25 is a sectional, front elevation of the fuel filling and venting assembly of FIG. 24 taken along plane XXV—XXV of FIG. 24.
Figure 26:
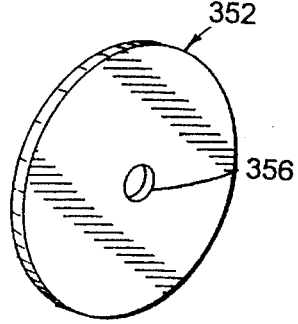
FIG. 26 is a perspective view of the thin, rigid disc shield member incorporated in the vented fuel filling assembly of FIGS. 24 and 25.

As shown in FIGS. 24–26, an alternate embodiment 350 of the fuel filling and venting assembly of the present invention is shown including an alternate rigid shield 352 as well as modified baffle 50' and modified fill tube 12a. Like parts are indicated by like numerals to those embodiments of the invention set forth above. Vented assembly 350 is substantially similar to embodiment 10 of the vented fuel fill assembly described above except for the substitution of a thin, rigid disc or washer 352 in place of flexible, resilient valve disc 180. Like fuel fill and venting assembly 300, however, the inclusion of rigid shield 352 provides a continuously open air passageway through the closure cap assembly allowing the vent tube 35a and fill tube 12a to continuously communicate with the atmosphere when the cap is closed.

Assembly 350 includes a closure cap assembly 354 having a base member 62, closure cap 95 including an integral hinge pin 112 adapted for receipt by hinge member 80 on base member 62, a latch assembly 130 for closing cap 95 over fuel fill opening 28a by engaging base member 62, a rigid, air passageway disc or washer 160 defining a tortuous air passageway through cap 95 in cap assembly 354, a well as sealing gasket 195 adapted to engage rim 22a on the neck of fill tube 12a and annular lip 68 on base member 62 to seal the opening to the fill tube 12a. As shown in FIG. 26, rigid shield 352 is preferably a noncorrosive, metallic washer formed in the shape of a thin, planar disc having a circular periphery and a central aperture 356. Preferably, disc 352 is formed from stainless steel, although cadmium or zinc coated steel, rigid plastic materials, or other non-corrosive materials could also be used. As shown in FIGS. 24 and 25, after air passageway disc or washer 160 is telescoped over center post 124 as in the previous embodiments, thin, rigid disc 352 is also telescoped over the center post against ring 166 such that it is spaced from the disc 160 and openings 164 therethrough to provide a continuously open vent passageway. However, the radial dimension of the disc 352 is sufficient to extend beyond the radial position of openings 164 such that disc 352 forms a barrier which obstructs and deflects the liquid fuel which might impinge thereagainst during a fuel surge so as to restrict entry of the liquid fuel into the openings 164 and, thus, the tortuous air passageway through the cap assembly. As in embodiment 10, rigid disc 352 is preferably held in place over post 124 by a plastic or metallic retainer such as tinnerman clip 190. As in embodiment 300, modified baffle 50' is positioned on shoulder 34a of fill tube 12a and is secured thereto by heat staked or formed over integral fastening posts 344 as described above.

In the event of fuel surge caused by splashing or sloshing during extreme boat movements, any liquid fuel passing upwardly through fuel tube 12 will strike rigid disc/washer 352 and be blocked it from entry into openings 164 and deflected laterally or back into tube 12a. As in assembly 300, fuel must change directions multiple times to circumvent disc/shield 352 and enter opening 164. Each change in direction reduces the amount of fuel available to enter those openings. Any small amounts of fuel which do enter openings 164 will be trapped within the tortuous air passageway to prevent escape from the cap assembly while allowing drainage back into the fill tube and tank after the surge passes. The engagement of sealing gasket 195, rim 22a and lip 68 prevents the escape of fuel between the remaining parts of the assembly.

While several forms of the invention have been shown and described, other forms will not be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A fuel filling and venting assembly for a liquid fuel tank comprising:

a fill tube adapted for connection to the fuel tank by a fluid conduit and having an opening and a mount for mounting said fill tube on a support;

a vent tube adapted for connection to the fuel tank by a separate fluid conduit, said vent tube joined to said fill tube and having a vent opening in fluid communication with said fill tube adjacent said fill tube opening to allow venting of fuel vapor from the fuel tank and admission of atmospheric air to the fuel tank through said fill tube opening while returning liquid fuel overflow to the fuel tank through said fill tube;

a closure cap mounted on said fill tube for closing said fill tube opening, said closure cap having an interior and being removable to open said fill tube opening;

an air passageway in said closure cap operable to pass air and fuel vapor to and from said fill tube opening while restricting ingestion of water and other contaminants;

said closure cap including an opening to said air passageway on said interior of said closure cap, a first rigid member forming a shield over said opening to said air passageway in said closure cap to restrict escape of liquid fuel outside said assembly during fuel surge due to splashing or the like, said shield having a periphery around which air and fuel vapor pass to and from said fill tube, said vent opening and said opening to said air passageway, and a spacer for spacing said shield from said air passageway opening to prevent closure thereof; and a baffle member in said fill tube, said baffle member extending between said vent opening and said fill tube opening and said shield to prevent expulsion of fuel from said vent tube opening out of said fill tube opening, and to restrict expulsion of fuel from said vent tube toward said shield.

2. The assembly of claim 1 including a hinge for pivoting said closure cap between said open and closed positions; said hinge including a hinge mount for mounting said hinge and closure cap on said fill tube; said baffle member including a fuel deflection flange adjacent said vent opening.

3. The assembly of claim 1 wherein said fill tube includes a shoulder therein supporting said baffle member, said shoulder and baffle member including cooperating fasteners to retain said baffle member on said shoulder.

4. The assembly of claim 1 including a tortuous fluid passage between the exterior of said closure cap and said air passageway for venting fuel vapor from the fuel tank, admitting atmospheric air to the fuel tank, and reducing the ingestion of water or other contaminants through said assembly to the fuel tank.

5. The assembly of claim 1 wherein said closure cap has an exposed side and an interior side; said shield in said closure cap including a second rigid member mounted in spaced relationship to said interior side of said closure cap and defining said air passageway, said second rigid member having at least one opening therethrough for fluid communication between said fill tube opening, said vent opening and said air passageway; said first rigid member spaced from said second rigid member and being positioned intermediate said opening in said second rigid member and said fill tube opening, said first rigid member adapted to obstruct and deflect liquid fuel from said opening in said second rigid member upon contact by liquid fuel during a fuel surge.

6. The assembly of claim 5 wherein said closure cap includes a peripheral rim defining a recess on said interior side, said tortuous fluid passage including at least one air channel extending away from said interior side, said air channel communicating with said air passageway and having an opening at a position spaced from said air passageway and between said closure cap peripheral rim and said air passageway.

7. The assembly of claim 6 wherein said closure cap includes a mounting post on said interior side; said second rigid member being a washer having a mounting aperture receiving said post; said first rigid member being a thin rigid disc having a mounting aperture receiving said post, and a fastener on said post retaining said thin rigid disc and washer on said post.

8. The assembly of claim 7 wherein said interior side of said closure cap includes an annular wall around the periphery of said washer; said closure cap including a seal for sealing said fill tube adjacent said fill tube opening; said seal including an annular resilient ring engaging said washer adjacent said washer periphery inside said annular wall; said air channel opening through said annular wall; said washer including an annular ridge opposite said seal and spacing said washer from said interior side; said annular ridge having an opening therethrough to said air passageway, said annular ridge opening spaced from said air channel to further define said tortuous fluid path.

9. The assembly of claim 5 wherein said closure cap includes a mounting post on said interior side; said first rigid member including a rigid disc and an annular wall extending to and engaging said second rigid member adjacent said mounting post, said annular wall spacing said rigid disc from said opening to said air passageway in said second rigid member; a fastener securing said rigid disc to said mounting post.

10. The assembly of claim 1 wherein said first rigid member is a thin rigid disc.

11. The assembly of claim 1 wherein said first rigid member is a rigid disc having an outer periphery, said spacer including an annular wall extending from one side of said rigid disc toward said interior of said closure cap and spacing said rigid disc therefrom, said rigid disc also including an annular flange on said one side adjacent said outer periphery.

12. The assembly of claim 1 including a hinge mounted between said fill tube and said closure for pivoting said closure cap between open and closed positions; said hinge including a base plate mounted on said fill tube mount, a first hinge member on one of said base plate and closure cap, and a hinge pin on the other of said base plate and closure cap.

13. The assembly of claim 12 including positioning means for locating said closure cap, hinge and base plate in one of a plurality of positions on said fill tube whereby said cap is positioned to open and close in a predetermined direction on said hinge.

14. The assembly of claim 13 wherein said fill tube opening has a central axis; at least a portion of said fill tube extending a predetermined angle to said central axis of said opening.

15. The assembly of claim 13 including latch means on said closure cap and base plate for releasably securing said closure cap in said closed position over said fill tube opening.

16. A fuel filling and venting assembly for a liquid fuel tank comprising:

a fill tube adapted for connection to the fuel tank by a fluid conduit and having an opening and a mount for mounting said fill tube on a support;

a vent tube adapted for connection to the fuel tank by a separate fluid conduit, said vent tube joined to said fill tube and having a vent opening in fluid communication with said fill tube adjacent said fill tube opening to allow venting of fuel vapor from the fuel tank and admission of atmospheric air to the fuel tank through said fill tube opening while returning liquid fuel overflow to the fuel tank through said fill tube;

a closure cap mounted on said fill tube for closing said fill tube opening, said closure cap being removable to open said fill tube opening;

an air passageway in said closure cap operable to pass air and fuel vapor to and from said fill tube opening while restricting ingestion of water and other contaminants; said closure cap including a first rigid member forming a shield over said air passageway in said closure cap to restrict escape of liquid fuel outside said assembly during fuel surge due to splashing or the like; said closure cap having an exposed side and an interior side; said shield in said closure cap including a second rigid member mounted in spaced relationship to said interior side of said closure cap and defining said air passageway, said second rigid member having at least one opening therethrough for fluid communication between said fill tube opening, said vent opening and said air passageway; said first rigid member spaced from said second rigid member and being positioned intermediate said opening in said second rigid member and said fill tube opening, said first rigid member adapted to obstruct and deflect liquid fuel from said opening in said second rigid member upon contact by liquid fuel during a fuel surge; said closure cap also including a mounting post on said interior side; said first rigid member including a rigid disc and an annular wall extending to and engaging said second rigid member adjacent said mounting post, said annular wall spacing said rigid disc from said opening to said air passageway in said second rigid member; a fastener securing said rigid disc to said mounting post; said rigid disc including a periphery; said first rigid member also including an annular flange adjacent said disc periphery helping to rigidify said disc.

17. The assembly of claim 16 wherein said closure cap includes an annular resilient sealing ring for sealing said fill tube adjacent said fill tube opening, said sealing ring extending between said rigid disc and said second rigid member and engaging said annular flange on said disc, said annular flange including at least one opening therethrough providing fluid communication between said opening to said air passageway and said fill tube and vent tube.

18. A fuel filling and venting assembly for a liquid fuel tank comprising:

a fill tube adapted for connection to the fuel tank by a fluid conduit and having an opening and a mount for mounting said fill tube on a support;

a vent tube adapted for connection to the fuel tank by a separate fluid conduit, said vent tube joined to said fill tube and having a vent opening in fluid communication with said fill tube adjacent said fill tube opening to allow venting of fuel vapor from the fuel tank and admission of atmospheric air to the fuel tank through said fill tube opening while returning liquid fuel overflow to the fuel tank through said fill tube;

a closure cap mounted on said fill tube for closing said fill tube opening, said closure cap having an interior and being removable to open said fill tube opening;

an air passageway in said closure cap operable to pass air and fuel vapor to and from said fill tube opening while restricting ingestion of water and other contaminants; said closure cap including an opening to said air passageway on the interior of said closure cap, a first rigid member forming a shield over said opening to said air passageway in said closure cap to restrict escape of liquid fuel outside said assembly during fuel surge due to splashing or the like;

a spacer for spacing said shield from said air passageway opening to prevent closure thereof; and a resilient seal positioned radially outwardly of said opening to said air passageway on said closure cap to close said fill tube opening when said closure cap is mounted on said fill tube, said shield having a periphery smaller than said fill tube, the air and fuel vapor passing around said shield periphery adjacent said resilient seal to and from said opening to said air passageway and said fill tube opening.

* * * * *